Feb. 18, 1969  L. E. BROWN  3,428,080
FLOW CONTROL DEVICE
Filed Feb. 21, 1966
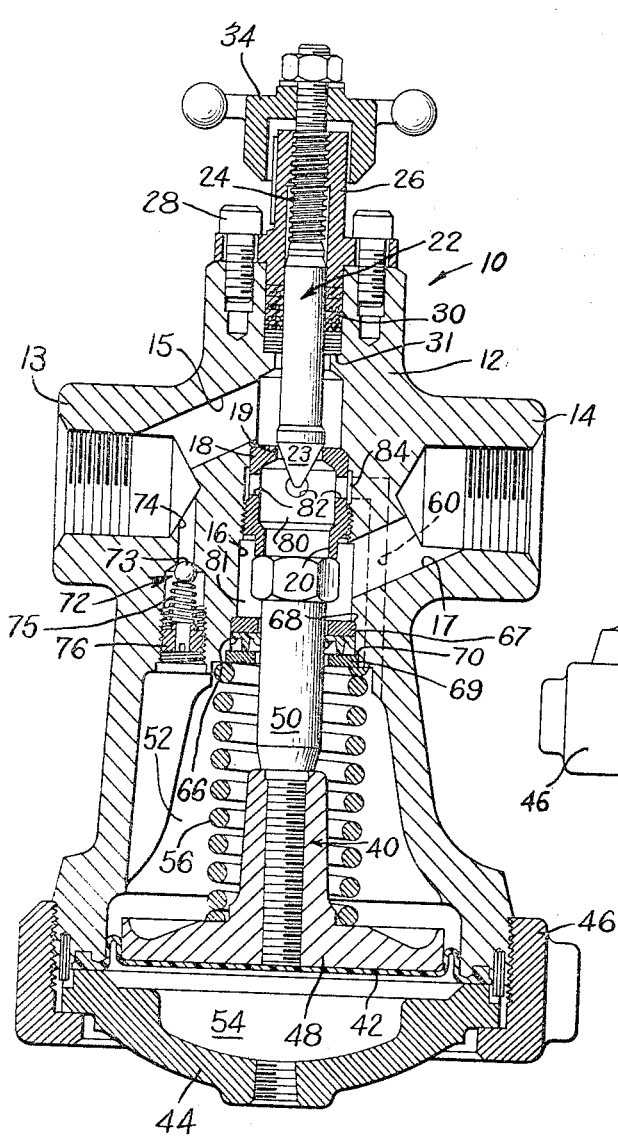
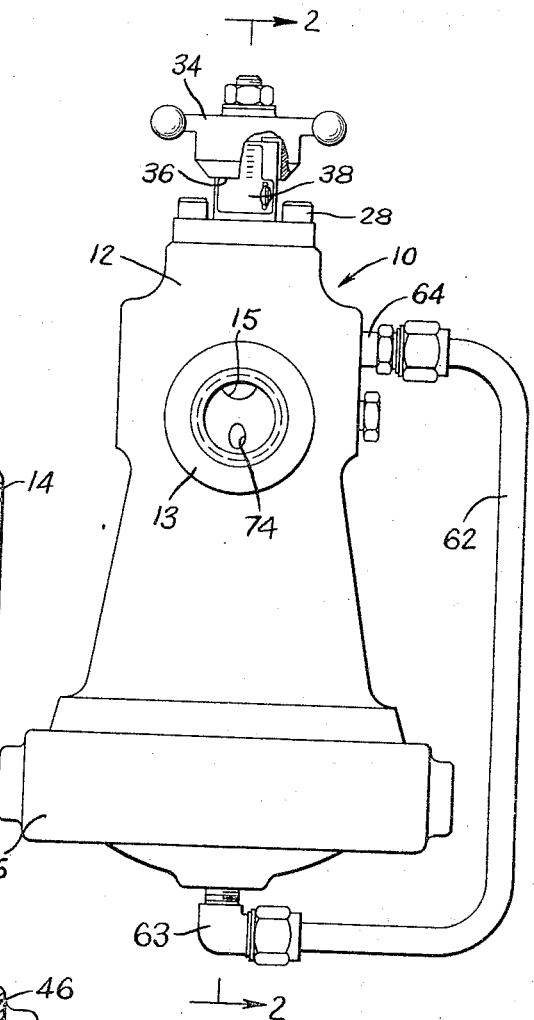
INVENTOR
LEWIS E. BROWN
BY
Bair, Freeman & Molinare
Attys.

United States Patent Office 3,428,080
Patented Feb. 18, 1969

3,428,080
FLOW CONTROL DEVICE
Lewis E. Brown, Marshalltown, Iowa, assignor to Fisher Governor Company, a corporation of Iowa
Filed Feb. 21, 1966, Ser. No. 528,980
U.S. Cl. 137—501  7 Claims
Int. Cl. G05d 7/01; F16k 31/12, 31/36

ABSTRACT OF THE DISCLOSURE

A flow control device to control a preselected flow rate to a constant value regardless of pressure variations in the upstream or downstream flow lines. The flow control device includes an orifice across which a constant pressure drop is maintained in use. The orifice may be adjustable to provide a range of preselected flow rates. Also included in the flow control device is a seat ring member which functions to provide better balancing across the meter pin orifice by minimizing adverse effects of turbulence of the fluid.

---

The present invention relates to a flow control device for maintaining a preselected fluid flow rate at a constant value regardless of pressure variations in the upstream or downstream flow lines.

An important application of the present invention is as a flow rate controller to control water injection into oil bearing formations as a means of recovering the crude oil in place. Heretofore, positive and adjustable choking devices have been used to regulate the flow of water into waterflood injection wells. Meters were installed on each input line to indicate the flow rate through the choking devices. Since a choking device acts as a fixed orifice, the flow rate through it is dependent on the differential pressure across it. To maintain a constant rate, choking devices must be constantly adjusted, or changed out, to compensate for variations in pump or formation pressures. These adjustments usually must be made based on only periodic meter readings.

More recently, the design of such flow rate controllers has been based on the fact that the maintenance of a constant pressure drop across an adjustable orifice will result in a constant flow rate. The adjustment of the orifice is used to provide the desired preselected fluid flow rate.

An object of this invention is to provide an improved flow control device for maintaining a preselected fluid flow rate at substantially a constant value regardless of pressure variations in the upstream or downstream flow lines, such flow control device including a unique seat ring member to provide better balancing across the meter pin orifice within the flow control device by minimizing adverse effects of turbulence of the fluid.

Another object of the present invention is to provide an improved flow control device including a flexible balancing seal around the stem of the diaphragm assembly for balancing the force generated by the variable pressure drop across the orifice betwen the chamber within the seat ring member and the chamber adjacent the outlet from the flow control device.

Yet another object of the present invention is to provide an improved flow control device for automatically controlling the rate of flow to maintain a constant value regardless of pressure variations in the upstream or downstream flow lines which includes a differential relief valve to protect the diaphragm against excessive differential pressures that might occur if the inlet pressure were turned on rapidly with the meter pin seated in the meter pin orifice. Other objects and advantages of the present invention will be made more apparent hereinafter.

The specific structural details of the invention and their mode of operation will be made most manifest and clearly pointed out in full, concise and exact terms in conjunction with the accompanying drawings, wherein:

FIG. 1 is a front view of a flow control device embodying the present invention; and FIG. 2 is a cross-sectional view of the novel flow control device of this invention taken generally along the line 2—2 of FIG. 1.

The flow control device 10 of the present invention includes a housing or body member 12 having an inlet 13 and an outlet 14 adapted to be secured to associated piping. The flow path or passage means for communicating the inlet 13 to the outlet 14 includes the passages 15, 16 and 17 defined within body member 12.

Disposed within the passage 16 and secured in threaded engagement with the body 12 is a seat ring member 18, which forms a part of the present invention. The seat ring member 18 is generally tubular and has a meter pin orifice 19 defined at one end and another orifice 20 defined at the opposite end. The meter pin 22 has a conical end 23 which cooperates with the orifice 19 to adjust the cross-sectional area of orifice opening. If desired, the shape of end 23 could be characterized, that is, a pin 22 having a linear end would have uniform change in flow for each equal increment of travel of the pin toward and away from the seat ring member. The upper end 24 of the meter pin 22 is threaded and is adapted to engage with internal threads in cap member 26 which is secured to the body 12 by means of machine screws 28. Suitable seal means 30 are disposed about the meter pin 22 between the cap or bonnet 26 and the shoulder 31 on body 12 to prevent the escape of fluid from within the body and between the body and the meter pin. A suitable handle 34 is affixed to the upper end of the meter pin 22 to provide for rotation thereof. The bottom surface 36 of the handle 34 cooperates with an indicia plate 38 affixed to the cap 26 to indicate the position of the metering pin 22 with respect to the orifice 19 and therefore the relative size of the orifice opening.

The diaphragm assembly 40 disposed in the lower end of the body 12 is adapted to regulate the flow of fluid through orifice 20 to the passage 17. The diaphragm assembly 40 includes a flexible diaphragm 42 which is affixed between the body 12 and the cap member 44. The cap member 44 is secured to the body 12 by means of a union nut 46. Body member 48 is operatively connected to the central portion of the diaphragm 42 and is movable therewith. A valve plug 50 is suitably secured to body member 48 as for example, by a threaded connection, and is adapted to seat against the bottom of the seat ring member 18 to control the flow of fluid through the orifice 20.

A chamber 52 is defined in the housing between the upper side of the diaphragm assembly 40 and the interior of the body member 12. Also, a chamber 54 is defined between the lower surface of the diaphragm 42 and the interior of the cap member 44. Spring member 56 disposed about the valve plug 50 coacts between the housing 12 and the diaphragm assembly to bias the valve plug 50 toward valve opening position to permit fluid flow through orifice 20.

Pressure from the downstream side of the orifice 19 is communicated to the chamber 52 via chamber 80 within seat ring member 18, ports 82 in seat ring member 18, the pressure chamber or annular piezo chamber 84 defined in the housing about the seat ring member, and an internal passage 60 in the body 12. Upstream pressure is communicated to the chamber 54 via an external conduit 62 which connects at one end with a fitting 63 secured to the cap member 44 and at the other end to a fitting 64 connected to the body 12 and adapted to communicate with the passage 15 in the body 12.

Disposed about the valve plug 50 is a flexible stem seal 66 which is adapted to be retained in place by means of washer 67 which abuts a shoulder 68 in the body 12 and another washer 69 which is biased against a shoulder 70 within the body 12 by means of the spring 56. The stem seal is preferably made from plastic, for example, polytetrafluoroethylene. Differential relief valve means 72 is provided to protect the diaphragm assembly against excessive differential pressures that might occur if the inlet pressure were turned on rapidly with the meter pin 22 in place in orifice 19 closing the orifice. The differential relief valve means 72 includes a ball valve 73 biased to close the valve seat defined at the end of the passage 74 by a spring 75, which is retained in place by a ported retainer 76 threadedly engaged within a threaded opening in the body 12.

Considering now the operation of the present flow control device 10, the adjustable meter pin 22 cooperates with the orifice 19 to provide a calibrated adjustable orifice. A constant pressure differential is maintained across the orifice 19 by means of a spring-opposed, diaphragm-operated valve plug 50, which cooperates with the orifice 20 in the seat ring member 18.

Since the diameter of the orifice 20 is relatively large, the variation in the position of the valve plug 50 to account for variations in upstream or downstream pressure variations is small, and thus the force from the spring 56 is virtually constant. Further, since the position of the valve plug 50 is determined by the balancing of the force from the spring and the differential pressure acting on the diaphragm 42, the differential pressure across the orifice 19 will be constant.

In operation, the meter pin 22 is adjusted to some preselected opening of the orifice 19, allowing an intermediate pressure (lower than that of the inlet or upstream pressure) to build up in the chambers 80, 84 and 52. This pressure acting on the upper surfaces of the diaphragm assembly 40, plus the force from the spring 56, will balance the upstream pressure acting on the surface of diaphragm 42 exposed to pressure in chamber 54 at some small opening of the valve plug 50 away from the end of the seat ring member 18.

Since the spring force of spring 56 is constant and the diaphragm area is constant, the difference between the inlet pressure and the intermediate pressure must be constant for the valve plug 50 to be in equilibrium. The outlet pressure will then be determined by the flow rate set and the character of the downstream system.

An increase in the upstream pressure will result in a momentary increase in flow through the opening between the conical end 23 of the meter pin 22 and the orifice 19 into the chamber 80. The same increase of inlet pressure is transmitted to the chamber 54 through the conduit 62 and applied to the diaphragm 42. The diaphragm assembly 40 will thus move upwardly as seen in FIG. 2 to reduce the opening between the end of the valve plug 50 and the bottom of the seat ring member 18 to bring the flow back to the present value. Conversely, a decrease in upstream pressure will result in a momentary decrease in flow into chamber 80. The same decrease of inlet pressure will also be felt in the chamber 54 and the spring 56 will urge the diaphragm assembly 40 downwardly as viewed in FIG. 2 to move the end of valve plug 50 away from the end of the seat ring member 18 defining orifice 20 to bring the flow back to the predetermined value.

An increase in the downstream pressure will result in in a momentary increase in pressure in chamber 80 and in chamber 52. This will cause the valve plug 50 to increase the opening between the chambers 80 and 81 to bring the flow back to its predetermined value. Conversely, a decrease in downstream pressure will result in a momentary decrease in pressure in chamber 80 and chamber 52. The diaphragm assembly 40 will be moved upwardly to reduce fluid flow through orifice 20 by reducing the opening between the top of the valve plug 50 and the bottom of the seat ring member 18 to bring the flow back to its preterminded set value.

The stem seal 66 is provided to balance the force generated by the variable pressure drop across the orifice 20 between the chambers 80 and 81. The seal is equal in size to the orifice 20 and is subject to the same pressure differential but in an opposite direction. The seal may be thought of as providing an equal and opposite force to the orifice imbalance or as subtracting from the area of the diaphragm assembly 40 in chamber 52. The flexible balancing seal is advantageous also because it will tolerate scale build up on the valve plug 50, as occurs under many operating conditions. Devices utilizing a close fitting piston-type balance would be rendered inoperative in the event of scale build up.

An important feature of the present invention is the construction of the seat ring member 18 and the disposition of the seat ring member 18 within the valve body 12. At each end of the seat ring member, there is provided an orifice with a cooperating valve plug. The conical end 23 of the meter pin cooperates with the orifice 19 and the valve plug 50 cooperates with the orifice 20. Openings 82 are provided within the sides of the seat ring member 18 for communicating the chamber 80 within the seat ring member with the annular piezo chamber 84 defined in the valve body about the seat ring member 18. As shown, there may be four openings 82 spaced 90° apart. The use of the seat ring member 18 provides better balancing by minimizing turbulence or the effects of the velocity energy of the flow through the meter pin orifice 19. It is desired that the effective pressure applied to the diaphragm assembly within chamber 52 be static pressure without false pressures or pressure effects due to velocity of the flowing fluid. The seat ring member 18 provides for more stable registration of the intermediate pressure by virtue of the configuration of the seat ring member and the cooperation of the seat ring member with the piezo chamber 84.

The differential valve means 72 functions to protect the diaphragm assembly against excessive differential pressures which might occur if the pressure applied at the inlet 13 were turned on rapidly when the meter pin was seated in orifice 19.

The flow control device could be constructed with a different type adjustment for the metering orifice. In its simplest application, an orifice of predetermined fixed size could be formed in the seat ring and the meter pin could be omitted. Further, the device 10 could be adapted for reverse flow or flow from opening 14 to opening 13 in an expeditious manner by connecting line 62 between passage 17 and chamber 54.

There has been provided by the present invention a novel flow control device for maintaining a preselected fluid flow rate substantially at a constant value regardless of pressure variations in the upstream or downstream flow lines. The flow control device utilizes a novel seat ring member for providing better balancing of the diaphragm assembly. The flexible balancing seal made from a suitable plastic such as polytetrafluoroethylene, not only functions to balance the force generated by the variable pressure drop across the orifice 20 but also provides for continuation of desired operation even if scale should build up on the valve plug 50, as may occur during certain modes of operation.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new and desire to secure by Letters Patent of the United States is:

1. A flow control device for maintaining a preselected substantially constant fluid flow rate regardless of pressure variations in the upstream or downstream flow lines comprising a housing having an inlet for communicating to an upstream flow line and an outlet for communicating to a downstream flow line, means in the housing defining a flow passage communicating the inlet and the outlet, a seat ring member in said flow passage defining a first orifice and a second orifice therein, pressure responsive means in the housing including a valve plug cooperating with said second orifice to control the flow of fluid therethrough and a diaphragm member operatively connected to the valve plug for actuating same, means for applying upstream pressure to one surface of the diaphragm, there being a pressure drop across the first orifice to provide a predetermined flow rate and there being a chamber in the seat ring member between the first orifice and the second orifice at a pressure intermediate the pressure in the upstream flow line and the pressure in the downstream flow line, an annular piezo chamber disposed about the seat ring member and communicating with the chamber in the seat ring member, so that said piezo chamber is at said intermediate pressure, a passageway communicating the piezo chamber with the opposed surface of the diaphragm to apply said intermediate pressure to said opposed surface of the diaphragm, and spring means for biasing the valve plug toward open position.

2. A flow control device as in claim 1 wherein a meter pin is adjustably supported on said housing for cooperating with said first orifice to vary the orifice opening to provide a predetermined flow rate.

3. A flow control device as in claim 2 wherein the seat ring member is tubular, said first orifice being at one end thereof and said second orifice being at the upper end thereof, the axis of said meter pin being aligned with the axis through said orifices and said meter pin being movable toward and away from the seat ring member to adjust the first orifice opening.

4. A flow control device as in claim 3 wherein the annular piezo chamber is disposed about the seat ring member intermediate the ends thereof and is communicated with the chamber in the seat ring member through opening means in the wall of the seat ring member, the seat ring member cooperating with said piezo chamber to minimize the adverse effects of the velocity energy of the flow through said first orifice opening.

5. A flow control device as in claim 1 wherein a differential relief valve provided in said housing is responsive to predetermined pressure for communicating said upstream pressure and said intermediate pressure for protecting the diaphragm against excessive pressure in the event upstream pressure were applied to the flow control device, while the meter pin was closed or narrowly restricting the opening through said first orifice.

6. A flow control device for maintaining a preselected substantially constant fluid flow rate regardless of pressure variations in the upstream or downstream flow lines comprising a housing having an inlet for communicating to an upstream flow line and an outlet for communicating to a downstream flow line, means in the housing defining a flow passage communicating the inlet and the outlet, a seat ring member in said flow passage defining a first orifice and a second orifice therein, pressure responsive means in the housing including a valve plug cooperating with said second orifice to control the flow of fluid therethrough and a diaphragm member operatively connected to the valve plug for actuating same, means for applying upstream pressure to one surface of the diaphragm, there being a chamber in the seat ring member between the first orifice and the second orifice, an annular piezo chamber disposed about the seat ring member and communicating with the chamber in the seat ring member, a passageway communicating the piezo chamber with the opposed surface of the diaphragm, spring means for biasing the valve plug toward open position, and an annular flexible balance ring disposed about the valve plug to balance the force generated by the variable pressure drop across the second orifice.

7. A flow control device as in claim 6 including a differential relief valve for protecting the diaphragm against excessive differential fluid pressures that might occur if the upstream pressure were applied to the flow control device while the meter pin was closed or narrowly restricting the opening through said first orifice.

References Cited

UNITED STATES PATENTS 3,043,332    7/1962    Henriques _____ 137—505.12 XR
3,344,805    10/1967    Wapner _____ 137—501 XR ALAN COHAN, *Primary Examiner.*

HOWARD M. COHN, *Assistant Examiner.*

U.S. Cl. X.R.

251—122